United States Patent [19]
Brookman

[11] 3,710,554
[45] Jan. 16, 1973

[54] WET COLLECTOR
[75] Inventor: Roger S. Brookman, East Aurora, N.Y.
[73] Assignee: Dustex Corp., Buffalo, N.Y.
[22] Filed: March 15, 1971
[21] Appl. No.: 123,969

[52] U.S. Cl. .................. 55/236, 55/238, 55/258, 55/460, 261/79 A
[51] Int. Cl. ............................................. B01d 47/06
[58] Field of Search ............... 55/235–241, 257–258, 55/460; 261/79 A

[56] References Cited

UNITED STATES PATENTS

| | | | |
|---|---|---|---|
| 1,264,263 | 4/1918 | Brassert | 261/79 A |
| 1,783,813 | 12/1930 | Schneible | 55/238 |
| 2,575,359 | 11/1951 | Ortgies | 55/236 X |
| 3,031,825 | 5/1962 | Dela Fourniere | 55/236 |
| 3,064,408 | 11/1962 | Erga | 55/233 X |
| 3,264,805 | 8/1966 | Tyler | 261/79 A |

Primary Examiner—Tim R. Miles
Assistant Examiner—Vincent Gifford
Attorney—Christel & Bean

[57] ABSTRACT

A wet collector comprising a housing having a primary separator for removing relatively heavy particulate material from a contaminated gas stream by means of centrifugal force and a secondary separator including a hollow cylindrical scrubbing element having a circular wall formed of a plurality of restricted passages for removing the remaining particulate material from the gas. Liquid is discharged into the secondary separator and is distributed over the wall of the scrubbing element by the moving gas stream.

11 Claims, 6 Drawing Figures

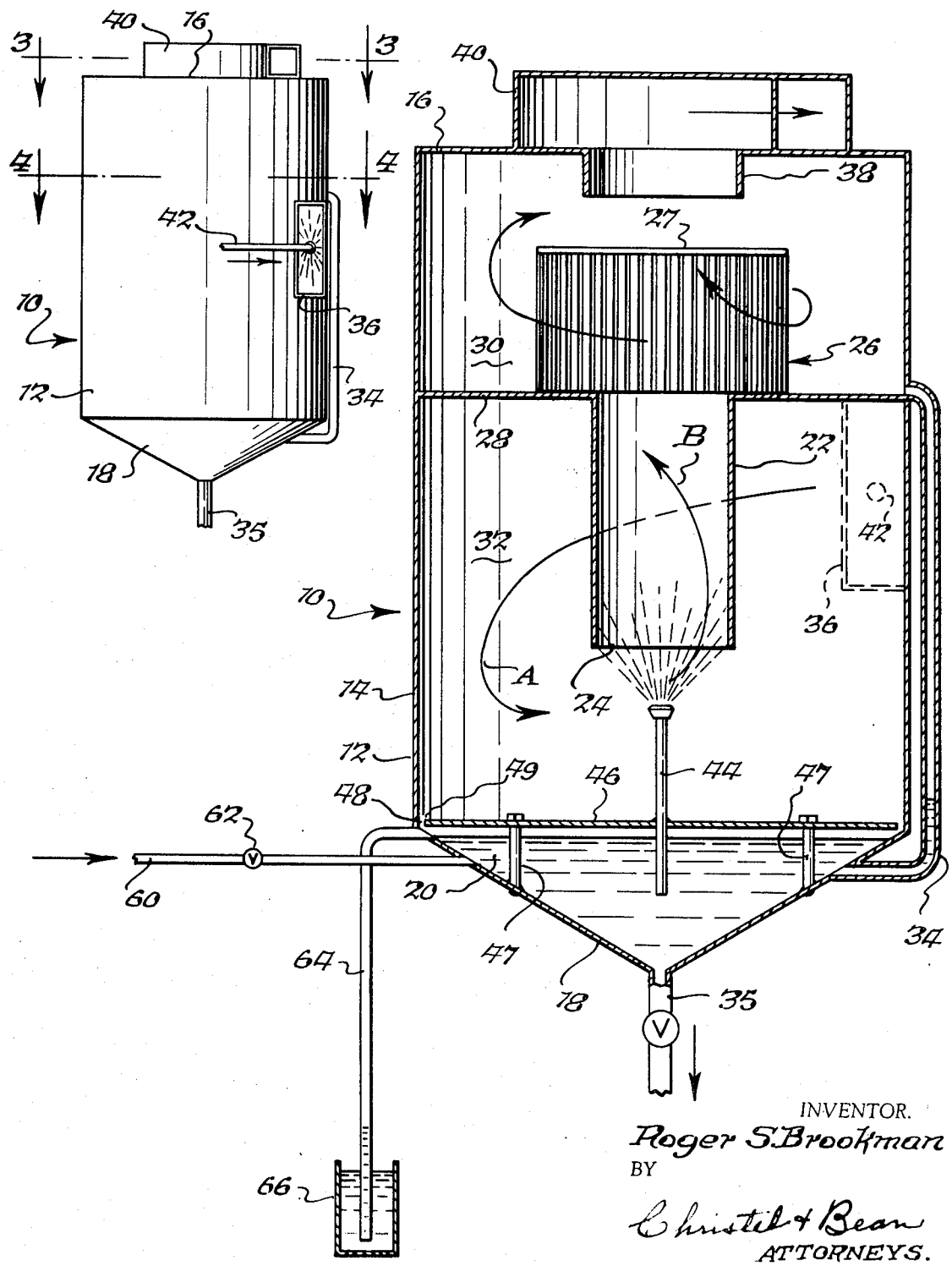

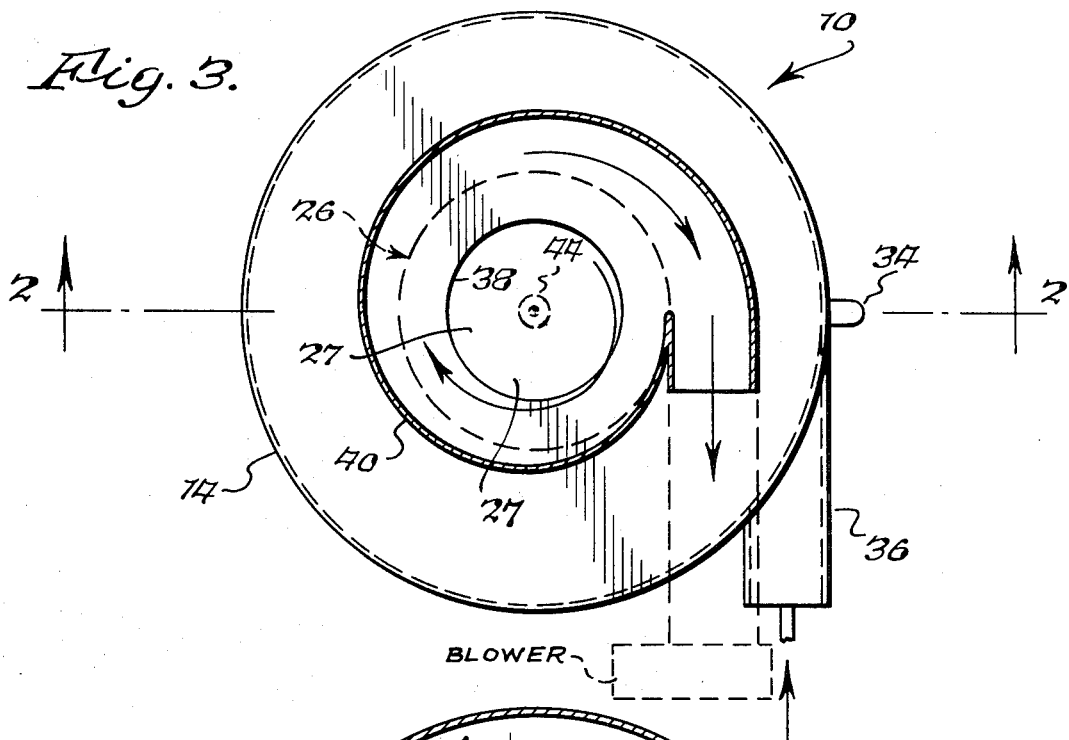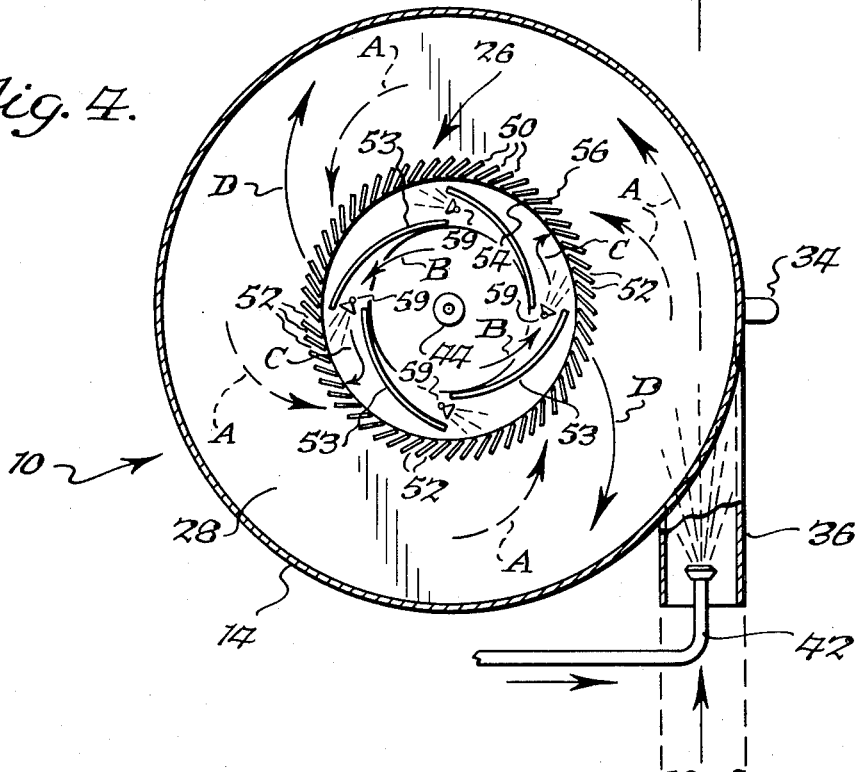

INVENTOR.
Roger S. Brookman
BY
Christel & Bean
ATTORNEYS.

3,710,554

WET COLLECTOR

BACKGROUND OF THE INVENTION

This invention relates to apparatus for cleaning contaminated gas and, more particularly, to a new and useful wet collector incorporating a gas scrubber.

In wet collectors of known type, it is customary to clean contaminated gas by employing a washing liquid spray whereby dust particles collide with the liquid droplets introduced into the air stream and are removed in various ways. Some well-known wet collector mechanisms utilize centrifugal force to accelerate the dust particles and impinge them against a wetted collector surface. Still other wet collector systems employ the atomizing-inertial principle wherein the kinetic energy of the gas stream is utilized to fragment or atomize a liquid on which to impact the dust particles. Very often, a perforated plate is used to expand the surface area of the liquid through use of the gas streams kinetic energy to augment the fragmentation and atomization of the liquid.

Although these various types of well-known wet collectors have served the purposes for which they were designed, they each have certain undesirable limitations such as high power requirements for the volume of gas cleaned, elaborate successive stage installations occupying large volumes of space, and expensive equipment including liquid pumps and/or impellers. In the case of perforated plate scrubbers mounted transversely across a column of contaminated gas, one limitation resides in the volume of gas which can be handled because the effective cleaning area of the scrubber is restricted to the cross sectional area of the column of gas passing through the plate. The invention described and claimed in pending application entitled Method and Apparatus for Separating Particulate Matter From a Gas Stream, Ser. No. 15,100, filed Feb. 27, 1970, which is a continuation-in-part of abandoned application Ser. No. 688,932, filed Dec. 7, 1967, having the same assignee as the instant application, obviates the above-noted deficiency by providing an atomizing inertial scrubber capable of handling an increased volume of gas without correspondingly increasing the size thereof. Extension and adaptation of the principles of that invention, for example to utilization in conjunction with centrifugal separation, is believed desirable.

SUMMARY OF THE INVENTION

The general purpose of the present invention is to provide a new and improved wet collector which is simple and strong in construction, low in cost, rugged and durable in use, highly resistant to clogging, and combines various principles of wet collector systems in a unique manner to produce a two-stage, unitary, efficient, packaged collector.

Another object of the present invention is to provide a new and improved wet collector having centrifugal primary separation for removing a large percentage of solid particles from a stream of contaminated gas and in conjunction therewith secondary separation incorporating in a unique manner the above-noted invention to remove virtually all of the remaining particles from said stream.

A further object of the present invention is to provide the foregoing in a wet collector wherein dry particles can be removed during the primary separation and wherein the remaining particles are wetted for removal during the secondary separation.

It is also an object of the present invention to provide a new and improved wet collector incorporating a gas scrubber downstream from a centrifugal section and provided with means for reversing the direction of spirally moving gas to provide an efficient cleaning action.

Still another object of the present invention is to provide a new and improved wet collector utilizing the moving gas stream to inject liquid upwardly into the stream of contaminated gas without the necessity of a pump, an impeller or any mechanism having moving parts.

Still another object of the present invention is to provide the foregoing in a wet collector having a reservoir which is continuously flushed to supply clean liquid and discharge contaminated liquid.

Still another object of the present invention is to provide the foregoing in a new and improved wet collector conveniently fabricated from welded metal plate having surfaces that are readily maintained wet.

DESCRIPTION OF THE DRAWINGS

FIG. 1 is an elevational view of a collector in which a preferred embodiment of the invention is incorporated;

FIG. 2 is an enlarged, vertical sectional view thereof, taken about on line 2—2 of FIG. 3;

FIG. 3 is a horizontal sectional view taken about on line 3—3 of FIG. 1 on an enlarged scale;

FIG. 4 is a cross-sectional, partly diagrammatic view taken about on line 4—4 of FIG. 1 on an enlarged scale;

DESCRIPTION OF THE PREFERRED EMBODIMENT

Figure 6:
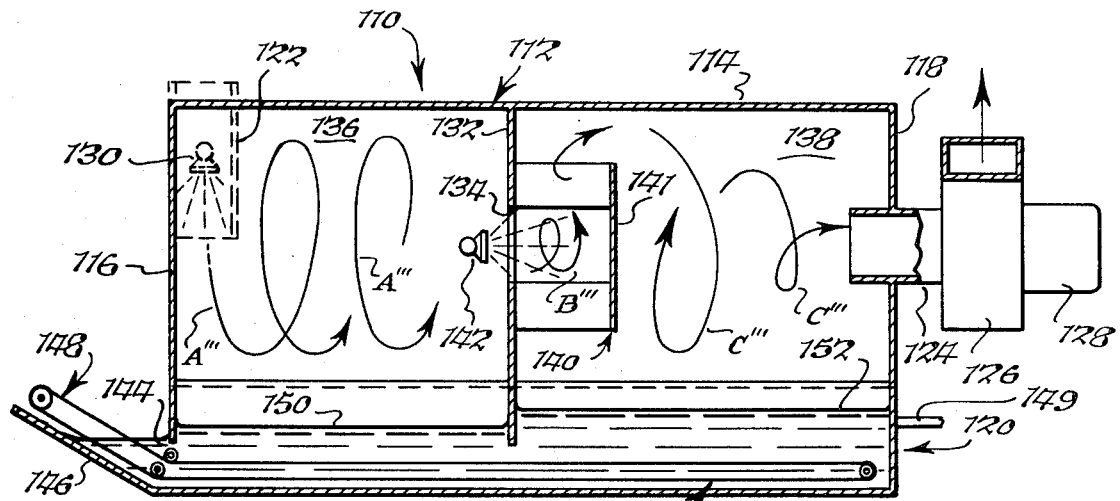
FIG. 6 is a vertical sectional view of a collector according to a third embodiment of the invention.

Referring now to the drawings in detail, there is shown a collector, generally designated 10, constructed in accordance with the principles of this invention and comprising a housing 12 having a cylindrical side wall 14, a flat top end wall 16, and a bottom wall 18 of inverted conical formation providing a fluid reservoir 20 at the bottom of housing 12. The terms top, bottom, upper, lower, upwardly, downwardly, and the like, as used herein, are applied only for convenience in description and should not be taken as limiting the scope of this invention. Although housing 12 preferably has a circular cross section, any suitable cross sectional configuration can be employed within the purview of the present invention.

A tubular inner casing 22, also of circular cross section and open at the bottom end 24 thereof, is mounted within housing 12 in concentric relation thereto, and a scrubbing element, generally designated 26 and shown in elevation in FIG. 2, is mounted over the open upper end of inner casing 22 in axial alignment therewith. Scrubber 26 is closed at the top by a wall 27. An annular separator plate 28 extends between the outer surface of inner casing 22 and the cylindrical wall 14 of housing 12, being secured to the latter and mounting both casing 22 and scrubber 26. Plate 28 divides the housing into an upper compartment 30 and a lower compartment 32, and a drain conduit 34 connects the upper compartment 30 to reservoir 20, the latter being provided with a bottom drain 35 for continual flushing of settled contaminants.

A tangential inlet duct 36 for admitting contaminated gas into housing 12 opens into lower compartment 32 below separator plate 28 and above the open lower end of inner casing 22. Water, or any other suitable liquid is introduced into inlet duct 36, if desired, by means of a suitable discharge nozzle 42 disposed in said inlet duct and connected to a suitable source of liquid supply, not shown. An axially disposed outlet duct 38 is provided in the top end wall 16 of housing 12 for exhausting clean gas from upper compartment 30. Duct 38 communicates by means of a scroll 40 with the suction side of a blower (indicated schematically in FIG. 3) driven by any suitable conventional means, not shown, the arrangement being such that gas is moved in a helical path from inlet 36 through compartment 32, casing 22, scrubber 26 and compartment 30, as indicated by the arrows and described hereafter. The lower compartment 32 serves as a primary, cyclone type separator to remove the larger, heavier, foreign particles from the contaminated gas admitted thereto and, if liquid is introduced into the gas stream, also serves to cool the gas.

Water, or any other suitable liquid is introduced into the open lower end 24 of inner casing 22 which functions as an exhaust for the primary separator and an inlet for the secondary separator comprising scrubber 26. It is a feature of this invention that liquid is introduced for this purpose by the pressure differential created by the moving gas stream in chamber 32, as follows. An upstanding conduit or pipe 44 has its upper end disposed adjacent the open lower end 24 of inner casing 22 and its lower end submerged in a pool of liquid in reservoir 20. A circular plate 46 is mounted over reservoir 20 adjacent the bottom of housing 12, as by means of studs 47, with its peripheral edge 49 spaced inwardly of cylindrical wall 14 to provide an annular space 48 therebetween. Pipe 44 is supported by plate 46 centrally thereof. The spirally moving gas stream passing through chamber 32 creates a vortex producing a radial pressure gradient across compartment 32. Pipe 44 is located at the center, which is the area of lowest pressure. The highest pressure is at wall 14, and plate 46 isolates the surface liquid in reservoir 20 from all except the high pressure zone of space 48 which causes the highest pressure to be effective over and across the surface of the liquid in reservoir 20. Thus, a maximum pressure differential is created between the liquid in reservoir 20 and the outlet of pipe 44, to produce the maximum flow of water through the pipe outlet into casing 22. In lieu of pipe 44, a liquid discharge nozzle similar to nozzle 42 and a pump can be employed, if desired, to discharge liquid upwardly into inner casing 22. However, the illustrated arrangement has the advantage of not requiring a pump, using instead the pressure differential existing within compartment 32 to introduce liquid into the inner casing 22.

As shown in FIG. 4, scrubbing element 26 is substantially circular in cross section and comprises an annulus of spaced shutter vanes 50 extending chordwise of the scrubbing element and defining a plurality of passages 52 between adjacent shutter vanes. Scrubbing element 26 preferably further includes a plurality of curved baffles 53 which can be mounted conveniently on the top wall 27 of scrubbing element 26, and which are positioned circumferentially around scrubbing element 26 and adjacent vanes 50 so that, in effect, there is provided a plurality of curved, single-sided, wedge-like shutter assemblies arranged in parallel. In this particular example, four curved baffles are provided thereby defining four curved wedges, but the exact number of baffles can be changed depending, among other things, on the operational parameters of collector 10.

It is important, however, that baffles 53 be shaped relative to the arc on which vanes 50 are arranged so as to maintain a uniform velocity of gas flowing between the baffles and the vanes, with a uniform gas flow through the entire shutter area, or substantially so, for maximum scrubbing effectiveness. To this end, each wedge defined by a baffle 53 and adjacent vanes 50 decreases in cross-sectional area from the inlet end to the outlet end thereof, which latter is left open to prevent plugging, the decrease in cross-sectional area corresponding to the decrease in the volume of gas being handled in that wedge.

Each shutter has a leading edge 54 and a trailing edge 56, the trailing edges of the shutter vanes constituting the outer peripheral surface of the scrubbing element. A plurality of discharge nozzles 59, equal in number to the number of baffles 53, can be provided at the inlets of the wedges defined between baffles 53 and vanes 50 as shown in FIG. 4, to introduce additional liquid into the moving gas stream from any suitable source, not shown.

In operation, the blower causes dirty or contaminated gas to be drawn into housing 12 through tangential inlet duct 36 and to flow in a helical or spiral course, as indicated by the arrows A in FIGS. 2 and 4, through lower compartment 32 between inner casing 22 and cylindrical wall 14 of housing 12. Simultaneously, liquid can be introduced into inlet duct 36 by means of discharge nozzle 42, and the swirling motion of the gas coacts with the liquid to distribute the same along the length of cylindrical wall 14 and also the outer surface of casing 22. At the same time, a suspension of liquid droplets is created in lower compartment 32. Particles of dust or other foreign matter, carried by the contaminated gas, are wetted in part by impact with the suspended water droplets and are thrown outwardly by centrifugal force into contact with the wet internal surface of cylindrical wall 14, where they are collected and continuously washed downwardly through the annular space 48 into the reservoir 20.

The partially cleaned gas is directed in a helical or spiral course into and through inner casing 22 and is further wetted by liquid discharged through conduit 44. The spiral movement of the gas stream continues in the same direction as indicated by arrows B and distributes the liquid evenly and uniformly upwardly across the entire inner surface of casing 22 and the entire inner peripheral wall surface defined by the leading, inner edges 54 of vanes 50. Thus, a film or blanket of liquid extends completely over the inner wall surfaces of inner casing 22 and of the scrubbing element vanes, thereby washing the inner surface of casing 22 and most importantly, distributing liquid uniformly over the inner ends 54 of shutter vanes 50 and across the inlet ends of passages 52 between adjacent shutter vanes. The particles of dust or other foreign matter remaining in the contaminated gas are further wetted by impact with the water droplets formed in inner casing 22 and by impinging against the wet internal surfaces of inner casing 22.

As the spirally moving gas stream moves through and beyond inner casing 22, it enters scrubbing element 26 and escapes therefrom through passages 52 between adjacent shutter vanes 50. Vanes 50 are oriented so that passages 52 are directed oppositely to the direction of the moving gas stream. As the gas enters passages 52, it passes through the layer of liquid across the inlet ends of the passages and reverses direction abruptly, creating turbulence which atomizes the liquid. The liquid droplets are carried through and beyond the restricted passages 52 and are further agglomerated with the particulate material by the turbulent interaction. With reference to FIG. 4, it will be seen that the shutter vanes are oriented in such a manner that the circulatory motion of the gas, as indicated by arrows B, contacts the leading edges 54 of the shutter vanes as at C in an oppositely spiraling direction and is interrupted thereby to radically change the flow as indicated by arrows D as it enters and exits from the passages 52. This reverse flow of the spirally moving gas stream enhances the generation of vortices which, together with the velocity differential between the entrained particulate material and the liquid droplets resulting from changes in the inertial forces accompanying such changes in direction increases the effectiveness of the scrubbing action and results in more efficient cleaning. The clean gas is discharged upwardly in a swirling motion, reversed from that in compartment 32, through outlet duct 38 which is smaller in diameter than the outer diameter of scrubber 26 to increase the speed of the vortex and thereby increase the centrifugal force on the entrained liquid particles which are thrown against the wall of chamber 30 and flow downwardly to the bottom of chamber 30 where they pass downwardly to reservoir 20 via conduit 34. This effectively eliminates the moisture from the gas stream. The dry gas passes from duct 38 into scroll 40 which converts the swirl into a linear flow to the inlet, suction end of the blower.

A significant feature of the present invention is that liquid is continuously flushed through the reservoir 20. The heavier particles of dust or other foreign matter settle toward the bottom of reservoir 20 where they can be periodically discharged through the drain 35. Discharge of the sludge draws a certain amount of liquid from reservoir 20. Also, liquid is displaced from the reservoir through pipe 44, which liquid must be replenished. Accordingly, liquid is continuously fed into reservoir 20 by means of a conduit 60 through a suitable control valve 62 to provide a continuous flushing action of reservoir 20 for removing the sludge from the bottom thereof and maintaining the upper portion clean.

A conduit 64 is provided in order to accommodate the overflow in reservoir 20, such conduit having one end connected to the upper portion of reservoir 20 with its other end terminating in a tank 66, the surface of the liquid in tank 66 being subjected to atmospheric pressure. In order to permit overflow, the vertical seal leg of conduit 64 is of a length sufficient to offset the difference between the internal pressure acting in the surface of liquid in reservoir 20 and atmospheric pressure.

According to a preferred mode of the present invention, dirty gas should be drawn through the four inlets of the scrubbing element wedges (between baffles 53 and vanes 50, nozzles 59 being disposed at these inlets) at a minimum velocity of 5,000 feet per minute, this apparently being the necessary minimum inlet gas velocity to balance the moving gas stream with the liquid being discharged and thereby effect a substantially uniform distribution of liquid across the inner wall of scrubbing element 26. Liquid must be discharged to the moving gas stream at a rate of from about 3 to about 7 gallons per minute per 1,000 cubic feet per minute of gas, with 3 gallons per minute per 1,000 cubic feet per minute of gas apparently being the minimum rate necessary for efficient operation, this being measured at the inlet to scrubbing element 26. Approximately a 2:1 ratio preferably should exist between the velocity of the moving gas stream as it passes through the scrubbing element wedge inlets, and the velocity of the gas stream through the restricted passages between adjacent shutters or vanes 52 in scrubbing element 26. Because scrubber efficiency is maintained while power consumption is reduced by a factor of about 2 when the inlet to shutter velocity ratio is increased from 1:1 to 2:1 and because any further increase in this ratio requires an accompanying increase in scrubber size, a ratio of about 2:1 is preferred for efficiency, lower power consumption and design freedom.

The wet collector according to the embodiment of FIGS. 1–4 has a centrifugal primary separator and a secondary separator in the form of a scrubber integrated into a unitary package of simple and economical construction. It combines a cylindrical scrubber incorporating the broad principles of application Ser. No. 688,932 with a centrifugal separator, adapting the former to coact with the latter, and vice versa, in a unique and highly desirable manner. The action of the swirling, spiraling gas stream flowing through the casing of the primary separator on the liquid being discharged therein moves that liquid along the inner wall of casing 22 and scrubbing element 26 in the axial and circumferential direction of the moving gas stream, effecting a substantially uniform distribution of liquid across the inner wall of scrubbing element 26, completely covering the same. Housing 12 and inner casing 22 can be formed of rolled metal plate and preferably assembled by welding to prevent any gas or liquid leakage so that the surfaces of these components can be easily maintained in a wetted condition.

While the foregoing arrangement includes the scrubber and moisture eliminator within the same casing so as to provide a unitary package, it should be understood that the wet collector of the present invention can include any desired size and arrangement of moisture eliminator. For example, a separate moisture eliminator section can be included alongside the scrubber section and connected thereto by means of a suitable duct. In such an arrangement, all of the gas and water which passes through the scrubber enters the separate centrifugal moisture separator which also serves as ductwork to a fan. Extremely heavy dust loads can be handled by such an arrangement, with the heavy-coarse sludge being discharge from the scrubber section and with the light-fine sludge being discharged from the moisture eliminator. This arrangement also advantageously permits easy maintenance of the shutter assembly and discharge nozzles, and has practically no susceptibility to plugging.

Figure 5:
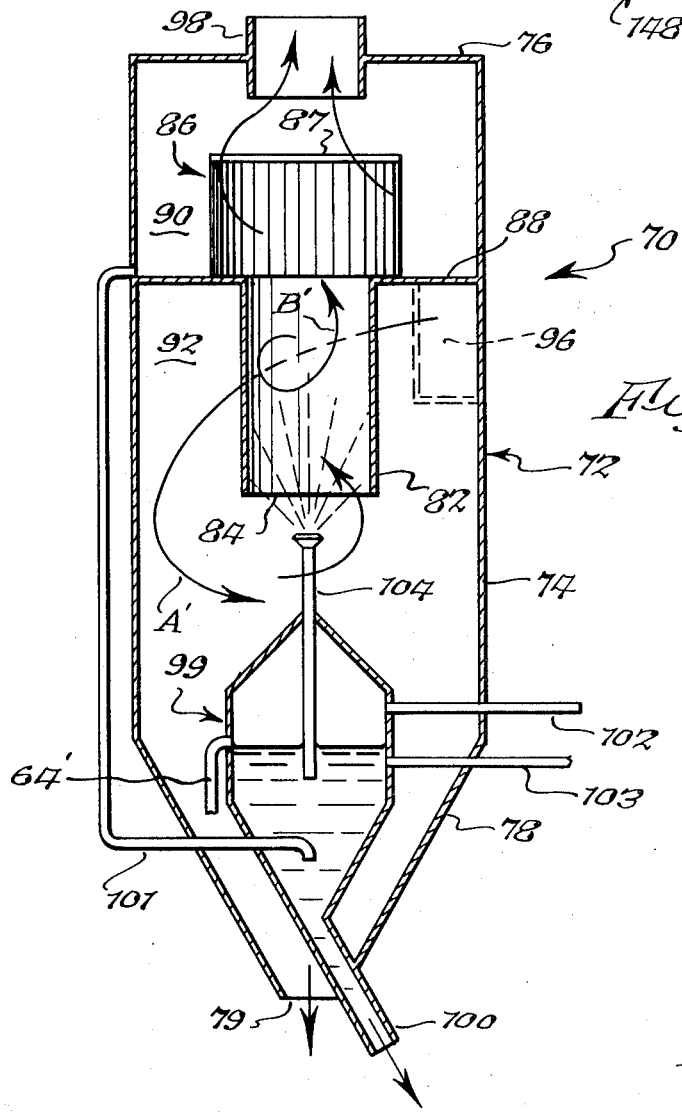
FIG. 5 is a vertical sectional view of a collector according to a second embodiment of the invention.

FIG. 5 shows a collector 70 constructed in accordance with a second embodiment of this invention wherein the first stage or primary separation discharges dry particulate material. Such a dry discharge from the first stage is useful when, for example, a product which should not be wetted is to be separated from a gas stream. Referring now to FIG. 5, collector 70 comprises a housing 72 having a cylindrical sidewall 74, a flat top end wall 76, and a bottom wall 78 of an inverted conical formation which terminates in a downwardly directed discharge opening 79. As with the foregoing embodiment, spatial terms such as top, bottom, and the like are used for convenience of illustration, and housing 72 while being preferably of a circular cross section also can be of any other suitable cross sectional configuration.

A tubular inner casing 82 is mounted within housing 72 and is open at the bottom end 84 thereof. The upper end of casing 82 also is open so as to be in communication with a cylindrical scrubbing element, generally designated 86, which is mounted over the upper end of casing 82 in axial alignment therewith and which is closed at the top by a wall 87. An annular separator plate 88 is secured between the outer surface of casing 82 and the cylindrical wall 74 of housing 72 for the purpose of supporting element 86 and dividing the housing into an upper compartment 90 and a lower compartment 92. The lower compartment 92 serves as a primary separator to remove the larger, heavier particles from the contaminated gas admitted thereto.

A tangential inlet duct 96 for admitting contaminated gas into housing 72 extends into lower compartment 92, below separator plate 88 and above the lower end of casing 82, and an axially disposed outlet duct 98 is provided in top end wall 76 of housing 72 for exhausting clean gas. Duct 98 can communicate by means of a scroll (not shown but like that of FIGS. 1-4) with the suction side of a blower (not shown) driven by suitable means all in a manner readily apparent to those familiar with apparatus of this type.

A liquid reservoir 99 is suitable mounted within housing 72 near the lower end thereof. Reservoir 99 in the illustrated form has a generally cylindrical middle section, a generally conical upper section, and a lower section of an inverted conical formation which terminates in a drain conduit 100 which extends through housing 72 and terminates externally thereof, A drain conduit 101 connects upper compartment 90 to the interior of reservoir 99, and a conduit 102 connects the interior of reservoir 99 to the atmosphere for a purpose which will be described hereafter. A liquid supply conduit 103 also is connected to the interior of reservoir 99 for supplying a suitable quantity of liquid thereto, and an overflow pipe 64', like pipe 64 of FIGS. 1-4, is provided.

An upstanding conduit or pipe 104 is supported in housing 72 whereby the upper end thereof is disposed adjacent the open, lower end 84 of casing 82 and the lower end of conduit 104 extends into reservoir 99 so as to be submerged in the liquid contained therein. The spirally moving gas stream passing through compartment 92 and into casing 82 through open end 84 thereof creates a vortex producing a negative pressure in compartment 92, at the outlet of pipe 104. At the same time, a positive pressure acts upon the liquid in reservoir 99 by virtue of the fact that the interior thereof is connected to ambient atmosphere through conduit 102. The resulting pressure differential between the upper end of pipe 104 and the interior of reservoir 99 will cause the liquid therein to be lifted and discharge upwardly through pipe 104 and into the open end 84 of casing 82. As with the embodiment of FIG. 1-4, a liquid discharge nozzle and pump can be employed, if desired, in lieu of pipe 104 to discharge liquid upwardly into casing 82.

Scrubbing element 86 can be identical in construction to scrubbing element 26 shown in FIGS. 2 and 4, in which case it is substantially circular in cross section and includes a plurality of spaced shutter vanes extending chordwise of the scrubbing element and defining a plurality of passages between adjacent vanes. Four curved baffles would be positioned in element 86 within the vanes and suitably mounted to the top wall 87 of element 86 so as to define four curved, single sided wedge-type shutter assemblies in parallel. The trailing edges of the shutter vanes constitute the outer peripheral surface of the scrubbing element while the leading edges define an inner wall surface of the scrubbing element. Nozzles corresponding to those shown at 59 in FIG. 4 can be provided at the shutter wedge inlets.

In operation, dirty or contaminated gas is drawn into housing 72 through tangential inlet duct 96, and the gas is caused to flow in a helical or spiral course as indicated by the arrows A' in FIG. 5. As the gas stream flows through lower compartment 92 the relatively heavy particles are thrown outwardly by centrifugal force into contact with the internal surfaces of cylindrical wall 74, whereupon they fall downwardly under the influence of gravity along the inner wall of bottom 78 and they exit from collector housing 72 through opening 79. The dry particles are the product of the first state of separation and can be collected externally of collector 70 by suitable means for subsequent treatment or packaging.

The partially cleaned gas is further directed in a helical or spiral course into and through casing 82 and is wetted by liquid discharged from conduit 104. During the second stage of separation, operation of collector 70 is substantially identical to that of collector 10 shown in FIGS. 1-4. The gas stream moves spirally in a direction indicated by arrows B' and distributes the liquid evenly and uniformly upwardly across the inner surface of casing 82 and the entire inner wall surface of scrubbing element 86. As the moving gas stream passes through and beyond casing 82 it contacts the scrubbing element 86 and escapes therefrom through the passages between adjacent shutter vanes, the direction of the moving gas stream being reversed as before. The particle-laden liquid drops are drained from compartment 90 by conduit 101 into reservoir 99 from which they exit through outlet 100. The clean gas is discharged upwardly through duct 98.

Thus, the first stage of separation performed by collector 70 is dry, with the separated particles exiting through opening 79. The second stage, during which the particles are wetted for separation, removes from the gas stream particles which are missed during the first stage of separation.

As in the embodiment of FIGS. 1–4, to effect the desired distribution of liquid across and along the scrubber elements in scrubber 86, the velocity of the gas stream as it moves through the wedge inlets of scrubber 86 should be at least 5,000 feet per minute and liquid should be discharged into the moving gas stream at a rate of at least 3 gallons per minute for each 1,000 cubic feet per minute of gas. Likewise, approximately a 2:1 ratio preferably should exist between the velocity of the moving gas stream as it passes through the scrubber wedge inlets and the velocity of the gas stream through the restricted passages between adjacent shutters in scrubber 86 and for the same reasons as in the embodiment of FIGS. 1–4.

FIG. 6 illustrates a collector 110 constructed in accordance with a third embodiment of this invention and having a housing 112 which includes a generally cylindrical shell 114 disposed so that the longitudinal axis thereof extends in a generally horizontal plane. Shell 114 is closed at the opposite axial ends thereof by first and second walls 116 and 118, respectively. Shell 114, in addition, is mounted on an elongated, generally rectangular chamber or reservoir 120 so as to be supported thereby, and the bottom wall of shell 114 is provided with an elongated opening which coincides with an elongated opening through the top of reservoir 120 whereby the interior of shell 114 is in communication with the interior of reservoir 120 for substantially the entire length thereof.

Housing 112 is formed with a tangential inlet duct 122 at one axial end thereof for admitting dirty or contaminated gas into housing 112. Housing 112 is further provided with a generally central, axially directed outlet duct 124 extending through end wall 118 of housing 112 for exhausting clean gas. Duct 124 communicates with the suction side of a blower 126 driven by a motor 128. Water, or any other suitable liquid is introduced into inlet duct 122 by means of a discharge nozzle 130 disposed in the duct and connected to a source of liquid supply (not shown).

A separator plate 132 is secured within shell 114 about midway of the axial ends thereof and is provided with a central opening 134 therethrough. A portion of plate 132 extends a substantial distance into reservoir 120 for a purpose to be described hereafter. Plate 132 is parallel to end walls 116, 118 and separates housing 112 into a primary separating compartment 136 and a secondary separating compartment 138. A cylindrical scrubbing element, generally designated 140, is mounted on plate 132 over opening 134 in axial alignment therewith and extends into compartment 138. Scrubbing element 140 is of a construction identical to that of scrubbing element 86 shown in FIG. 5 or scrubbing element 26 shown in FIGS. 1–4. Openings 134 defines the inlet to scrubbing element 86 which is closed at its opposite end by a wall 141. Water or any other suitable liquid is introduced at the opening 134, and therefore adjacent scrubbing element 140, by means of a suitable discharge nozzle 142 supported within housing 112 and connected to a liquid supply (not shown).

Reservoir 120, in addition to being opened to the interior of housing 112, is provided with an opening 144 at one end thereof for the purpose of removing sludge. The bottom of reservoir 120 is extended by an inclined portion 146 outwardly from opening 144. Reservoir 120 is provided with a mechanical sludge ejector in the form of conveyor 148 which extends for the entire length of reservoir 120, upwardly and outwardly onto inclined portion 146. Reservoir 120 is filled with water by means of a liquid supply conduit 149 connected to the interior thereof, and the water has three levels, the two internal levels being designated 150 and 152. The operation of collector 110 requires a pressure differential between compartments 136 and 138, and for this reason plate 132 extends into the liquid in reservoir 120 so as to maintain this pressure differential as indicated by the difference between levels 150, 152.

In operation, dirty or contaminated gas is drawn into housing 112 through tangential inlet duct 122 when blower 126 is placed in operation, and the gas flows in a helical or spiral course through compartment 136 as indicated by the arrows A''' in FIG. 6. Simultaneously, liquid is introduced into duct 122 by discharge nozzle 130, and the swirling motion of the gas generated by blower 126 coacts with the liquid to distribute the same along the length of cylindrical shell 114 in chamber 136. At the same time a suspension of liquid droplets is created in chamber 136. Particles of dust or other foreign matter carried by the contaminated gas are wetted in part by impact with the suspended water droplets and are thrown outwardly by centrifugal force into contact with the wet internal surfaces of cylindrical 114 where they are collected and continuously washed downwardly through the opening in shell 114 into chamber or reservoir 120. As the particles accumulate in the liquid contained by reservoir 120 they form a sludge which is removed from reservoir 120 by means of conveyor 148.

The partially cleaned gas continues in a helical or spiral course and is further wetted by discharge nozzle 142 as the gas enters the opening 134 in disc 132. The spiral movement of the gas stream continues in the same direction as indicated by arrows B''' and distributes the liquid evenly and uniformly across the entire inner wall surface of scrubbing element 140, as previously described in connection with FIGS. 1–4. The spiraling, moving gas stream enters scrubbing element 140 and the spiral course of the gas flow is reversed therein, whereupon the gas escapes therefrom through the passages between adjacent shutter vanes. In other words, scrubbing element 140 operates on the gas stream in the same manner as scrubbing element 86 shown in FIG. 5 and scrubbing element 26 shown in FIGS. 1–4.

The clean gas is discharged from scrubbing element 140 and flows in the reversed helical or spiral path through compartment 138 as indicated by the arrows designated C''' in FIG. 6. The liquid droplets agglomerated with the particulate material by the turbulent interaction are thrown against the shell wall and move by gravity to the lower surfaces of cylindrical shell 114 and then through the opening therein into reservoir 120. The resulting sludge formed in the liquid contained by reservoir 120 is removed by conveyor 148 as previously described. The centrifugal force acting on the gas stream removes any moisture remaining therein and the dry, clean gas exits from housing 112 through duct 124 and scroll 126.

As in the first two embodiments, to effect the desired distribution of liquid across and along the scrubber element in scrubber 140, the velocity of the gas stream as it moves through the four scrubber wedge inlets should be at least 5,000 feet per minute and liquid should be discharged into the moving gas stream at a rate of at least 3 gallons per minute for each 1,000 cubic feet per minute of gas. Likewise, approximately a 2:1 ratio preferably should exist between the velocity of the moving gas stream as it passes through the wedge inlets and the velocity of the gas stream through the restricted passages between adjacent shutters in scrubber 140 and for the same reasons as in the foregoing embodiments.

It is, therefore, apparent that the present invention accomplishes its intended objects. While several illustrated embodiments thereof have been described in detail, this has been done by way of illustration without thought of limitation.

I claim:

1. Apparatus for separating particulate material from a contaminated gas stream comprising: a housing having an inner wall surface; means defining first and second compartments in said housing; a tangential inlet for dirty gas communicating with said first compartment; a scrubbing element having an inlet communicating with said first compartment and an outlet communicating with said second compartment; means for moving gas through said tangential inlet and in a spiral course through said first compartment to and through said scrubbing element; said scrubbing element having a plurality of restricted passages therethrough defined by a plurality of annularly arranged shutter vanes oriented oppositely to the spiral course of gas flow through said first compartment to cause a reversal in the spiral direction of gas flow; said scrubbing element further comprising a plurality of baffle means positioned within the annulus of said shutter vanes, said baffle means being arranged and shaped relative to the arc on which said vanes are arranged to define a plurality of generally wedge-shaped assemblies, each wedge having an inlet and decreasing in cross-sectional area in a direction away from the inlet in substantial correspondance to the decrease in the volume of gas occupying said wedge thereby to maintain a substantially uniform velocity of gas flowing between said baffle means and said vanes; means for discharging liquid into said scrubbing element; said gas moving means coacting with said liquid discharging means to distribute liquid substantially evenly across the inner surface of said scrubbing element.

2. Apparatus according to claim 1 wherein said scrubbing element comprises an annulus of said shutter vanes and wherein said baffle means comprises a plurality of curved baffles positioned circumferentially therein and adjacent said vanes so as to define said plurality of wedge-shaped assemblies, open at the outlet end thereof.

3. Apparatus according to claim 1 wherein said gas moving means draws dirty gas through the inlets of said scrubbing element wedges at a minimum velocity of about 5,000 feet per minute and wherein liquid is discharged to the moving gas stream at a rate measured at the inlet of said scrubbing element of from about 3 to about 7 gallons per minute per 1,000 cubic feet per minute of gas.

4. Apparatus according to claim 3 wherein about a 2:1 ratio is maintained between the velocity of the moving gas stream at said wedge inlets of said scrubbing element and the velocity thereof through said restricted passages.

5. Apparatus according to claim 1 wherein said scrubbing element is provided with a plurality of liquid discharge nozzles at the inlets of said wedge-shaped assemblies.

6. Apparatus according to claim 1, wherein said means defining said first compartment includes a casing mounted within said housing and defining an annular first compartment therebetween, said casing having an inlet opening at one end to said first compartment and communicating at the other end with the inlet of said scrubbing element whereby said scrubbing element communicates with said annular first compartment through said casing; and wherein said means for discharging liquid into said scrubbing element comprises a liquid reservoir in said first compartment in said housing; means supplying liquid to said reservoir; and means connected to said reservoir for discharging liquid into said casing inlet opening.

7. Apparatus according to claim 6 further including conduit means connecting said second compartment to said reservoir at a level below that at which liquid is supplied to said reservoir and outlet means from said reservoir for removing sludge therefrom.

8. Apparatus according to claim 6 wherein liquid is forced from said reservoir through said discharge means by the pressure condition created in said first compartment by the spirally moving gas stream.

9. Apparatus according to claim 6 further including means for discharging liquid into said tangential inlet.

10. Apparatus according to claim 6 wherein said first compartment of said housing is provided with an outlet through which dry particulate material passes upon being separated from the gas stream as the stream moves through said annular compartment.

11. Apparatus according to claim 1 wherein said housing is disposed so that the longitudinal axis thereof lies in a generally horizontal plane, said scrubbing element is positioned in said housing axially spaced from said tangential inlet, and wherein said apparatus further includes means for discharging liquid into said tangential inlet, a liquid reservoir beneath said housing and in communication with the interior of said housing for substantially the entire length thereof, and means for removing sludge from said liquid reservoir.

* * * * *